United States Patent [19]

Bellar

[11] Patent Number: 4,636,043
[45] Date of Patent: Jan. 13, 1987

[54] LASER BEAM SCANNING DEVICE AND MARKING SYSTEM

[75] Inventor: Dennis R. Bellar, Orlando, Fla.

[73] Assignee: Laser Photonics, Inc., Orlando, Fla.

[21] Appl. No.: 584,987

[22] Filed: Mar. 1, 1984

[51] Int. Cl.$^4$ ............................................. G02B 26/08
[52] U.S. Cl. ................................... 350/484; 350/445
[58] Field of Search ................ 350/484, 6.1, 6.3, 462, 350/479; 346/76 L, 108

[56] References Cited

U.S. PATENT DOCUMENTS

| | | | |
|---|---|---|---|
| 3,427,634 | 2/1969 | Crabtree et al. | 346/108 |
| 3,474,457 | 10/1969 | Becker | 346/76 |
| 3,573,847 | 8/1971 | Sacerdoti | 346/76 |
| 3,664,737 | 5/1972 | Lipp | 355/18 |
| 3,701,880 | 10/1972 | Rively et al. | 219/121 EB |
| 3,721,991 | 3/1973 | Kaufman | 346/108 |
| 3,761,675 | 9/1973 | Mason et al. | 219/121 LM |
| 3,781,902 | 12/1973 | Shim | 346/24 |
| 3,842,195 | 10/1974 | Takahashi et al. | 178/5.4 CD |
| 3,883,737 | 5/1975 | Throssell et al. | 250/235 |
| 3,909,103 | 9/1975 | Graves | 350/6 |
| 3,943,529 | 3/1976 | Feldman et al. | 346/108 |
| 3,965,476 | 6/1976 | Wenander et al. | 346/1 |
| 3,970,781 | 7/1976 | Dalton et al. | 178/7.6 |
| 4,028,732 | 6/1977 | Salter | 358/289 |
| 4,030,122 | 6/1977 | Chemmelli et al. | 358/127 |
| 4,037,075 | 7/1977 | Pugsley et al. | 219/121 L |
| 4,125,755 | 11/1978 | Plamquist | 219/121 L |
| 4,131,782 | 12/1978 | Einstein et al. | 219/121 LM |
| 4,253,724 | 3/1981 | Minoura et al. | 350/6.8 |
| 4,352,973 | 10/1982 | Chase | 219/121 LH |

OTHER PUBLICATIONS

IBM Tech. Bull., vol. 13, #2, Jul. 1970.

Primary Examiner—John K. Corbin
Assistant Examiner—Vincent J. Lemmo
Attorney, Agent, or Firm—U.S. Commissioner of Patents and Trademarks

[57] ABSTRACT

A laser beam scanning device is disclosed and which includes an optical system that is mounted on a carriage which is movable back and forth along a linear path in front of a target area and which is parallel to the optical path of a projected laser beam. The lens system includes a component on the carriage which is arranged in the optical path for the laser beam and serves to project the laser beam along a second optical path toward the target area and which is normal to the first optical path. The optical system also includes a focusing lens on the carriage which is arranged in the second optical path for focusing the laser beam on the target area. A pair of lenses that are mounted on the carriage as part of the optical system are arranged to form a collimating telescope so as to expand and then collimate the laser beam light for delivery to the focusing lens. The collimating lens of the pair is movable relative to the carriage along a path which is normal to the optical path so as to thereby shift the focal point in the target area. The device utilizes stepping motors for moving the carriage and collimating lens. The device is shown as a component of a laser marking system where the laser system and scanning device are controlled by a computerized control system.

9 Claims, 14 Drawing Figures

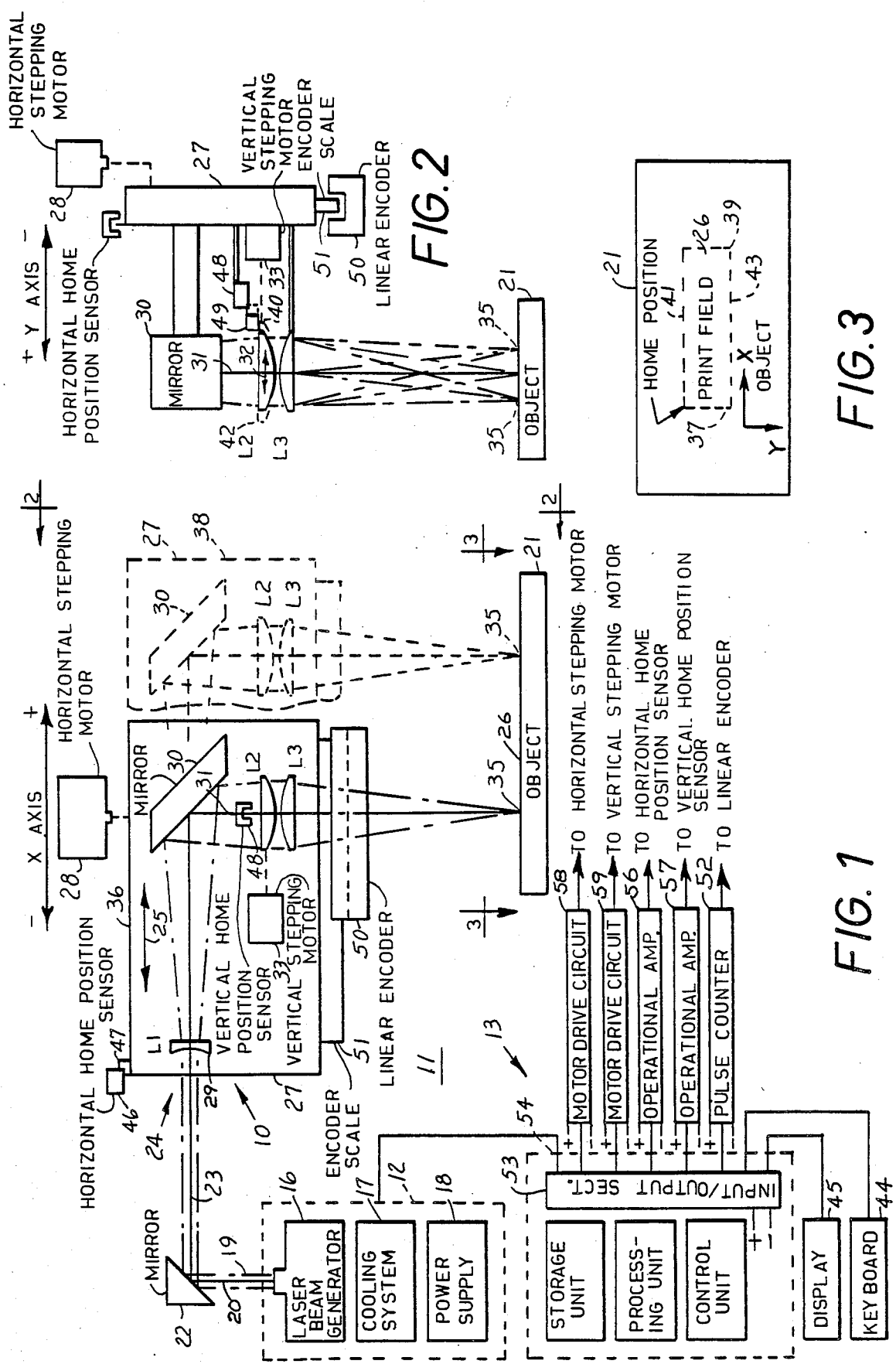

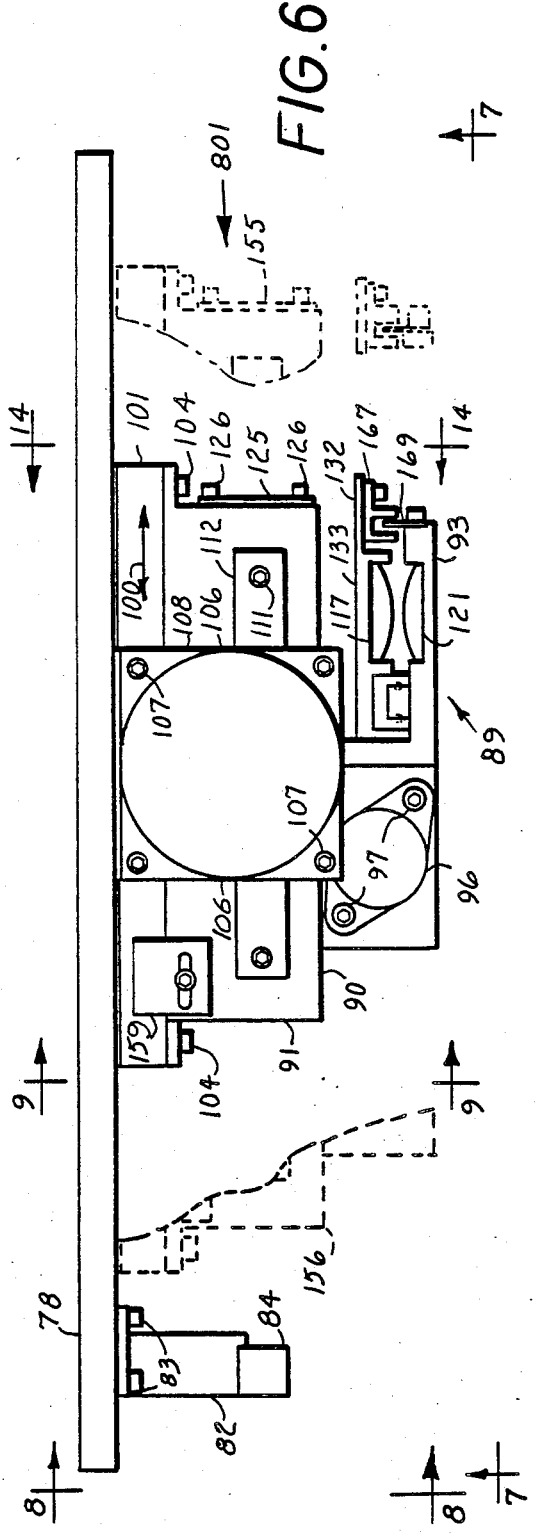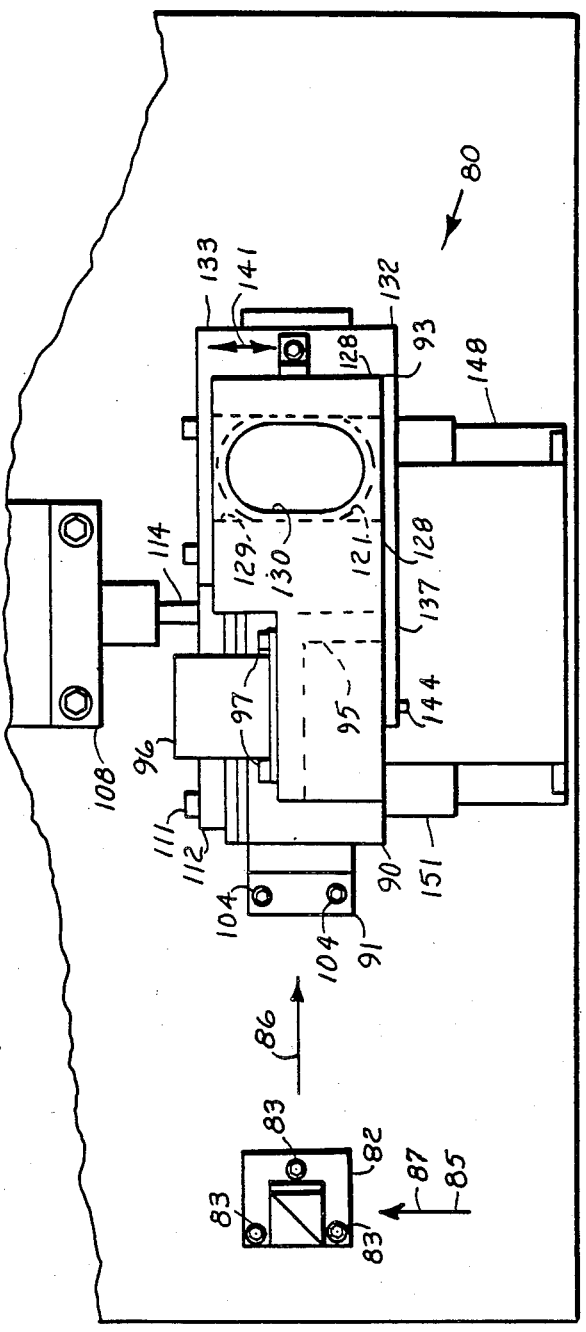

LASER BEAM SCANNING DEVICE AND MARKING SYSTEM

This invention relates to a laser beam scanning device and to a laser marking system that utilizes such a device as a component of the system.

BACKGROUND

The use of laser beam energy for printing and marking purposes has been limited because of the high costs associated with the manufacture and use of the beam scanning devices. Furthermore, the sensitivity of such devices to vibrations and mishandlings of the equipment by workers in the work areas of use have detracted from the wide spread use of such devices. Beam masking systems are used in some scanning devices. These suffer from the operational disadvantage that considerable energy is absorbed by the masks and hence are less than desirable because of the high energy costs associated with their use. They also require rather complex systems for handling the masks and which also contribute to excessive manufacturing costs. Other scanning devices utilize expensive galvanic deflection and/or other devices that are highly sensitive to vibrations and equipment mishandlings which commonly occur in the work area. Such devices are not only expensive to manufacture but obviously lack the ruggedness desired in many work applications.

A general object of the invention is to provide an improved laser beam scanning device. Another object is to provide improvements in laser beam scanning devices which facilitate the use of lower cost items in the manufacture of such devices, typical of such lower cost items being simple, inexpensive lenses that are readily available in the market area. Another object is to provide improvements that facilitate a compact arrangement of the components in the beam scanning device. Yet another object is to provide improvements that avoid the use of masks and galvanic deflectors in beam scanning devices that are used in laser marking systems. Yet another objective is to provide an improved laser beam scanning device that is especially suited for printing in a dot matrix format and which readily lends itself for use in laser marking systems of the type requiring but a few lines of alphanumeric information, such as found, for example, in systems used for labelling packages or marking metal parts for identification purposes.

BRIEF SUMMARY OF THE INVENTION

In accord with the invention, provisions are made for projecting a laser beam along an optical path and a carriage is moved back and forth along a path which is parallel to a linear portion of this optical path. The carriage is equipped with and carries an optical system which includes means located in the optical path for projecting the laser beam along a second linear portion of the optical path and which preferably is generally perpendicular or normal to the first linear portion of the optical path. The optical system also includes a means for focusing the laser beam on a target area and which is preferably located in the second linear portion of the optical path. The optical system transported by the carriage also includes a light collimator with a light collimating lens that is movable relative to the carriage and laterally of the optical axis of the focusing means and preferably along a path which is generally perpendicular or normal to the second linear portion of the optical path for the laser beam. Provisions are made for moving the carriage back and forth in front of the target area through use of a stepping motor in accord with certain aspects of the invention and provisions are similarly made for incrementally moving the lens relative to the carriage through use of another stepping motor that is mounted on and movable with the carriage. In the marking system, the movements of the carriage and of the collimating lens are accomplished by stepping motors that operate under the control of a computerized control system as will be subsequently seen. The target area is stationary when being scanned and is scanned by the laser beam along its x-axis through the advent of the carriage movement while the laser beam is scanned along the y-axis of the target area for reasons of the movement of the lens as will also be seen subsequently.

BRIEF DESCRIPTION OF THE DRAWINGS

The novel features which are believed to be characteristic of this invention are set forth with particularity in the appended claims. The invention, itself, however, both as to its organization and method of operation, together with further objects and advantages thereof, may best be understood by reference to the following description taken in connection with the accompanying drawings, wherein:

FIG. 1 diagrammatically illustrates a sanning device embodying the principles of the invention and schematically shows components of a laser marking system that may be used in operating and controlling the scanning device;

FIG. 2 further illustrates the scanning device shown in FIG. 1 and shows certain components of the scanning device that are diagrammatically illustrated therein as generally seen along the Lines 2—2 thereof;

FIG. 3 is a plan view of the object depicted in FIG. 1 for marking and as generally seen along the Lines 3—3 thereof so as to illustrate the print or labelling area;

FIG. 6 is a front side elevation of the beam scanning device utilized in the laser marking system shown in FIG. 5, with the approximate limits of linear movement of the horizontal carriage assembly being generally shown in broken lines;

FIG. 7 is a bottom plan view of the laser beam scanning device shown in FIG. 6 and as seen along the Lines 7—7 thereof with certain parts being broken away;

DETAILED DESCRIPTION

Figure 4:
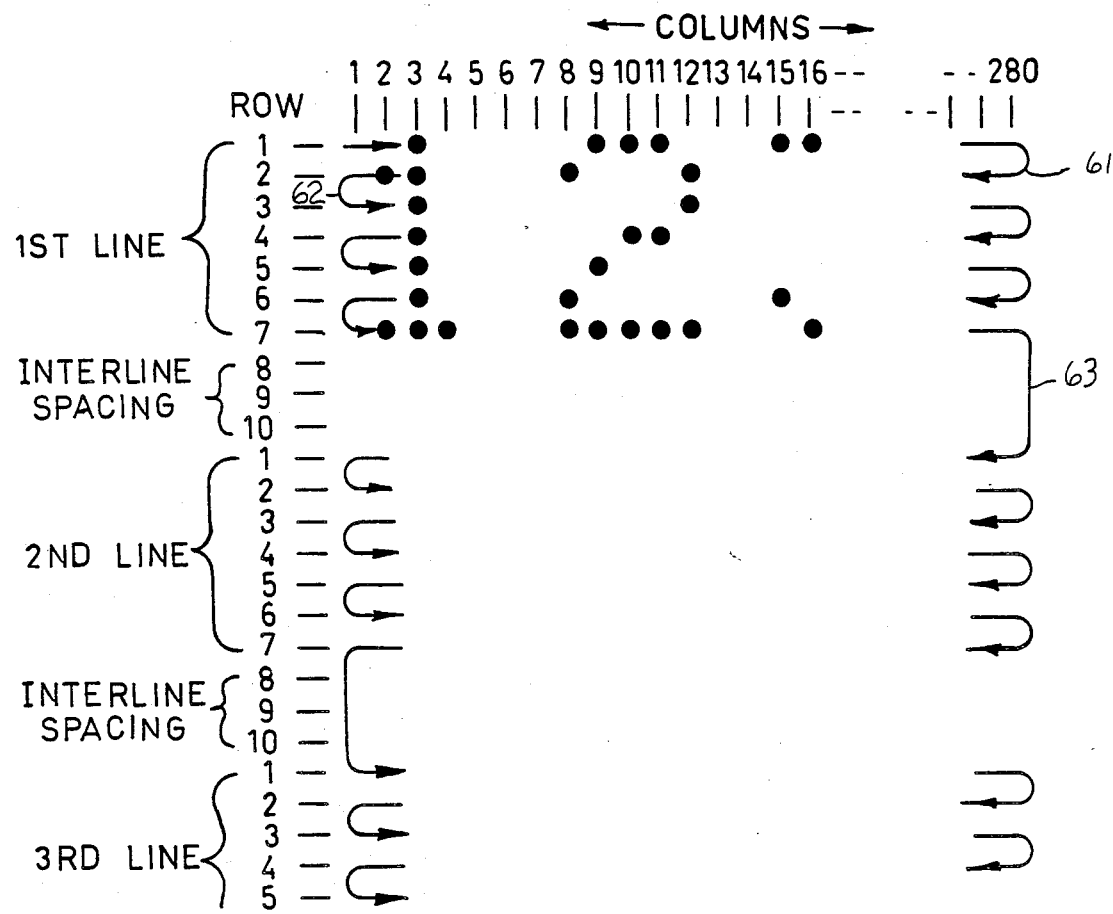
FIG. 4 is a diagrammatic view of one method of scanning the target area which is possible through use of the scanning device illustrated herein.

It can be shown that if a laser beam is passed through a pair of lenses ($L_1$) and ($L_2$) that are arranged to form a collimator or collimating telescope and then passed through a positive lens ($L_3$) designed to focus the beam on a target area, the lateral movement of the collimating lens ($L_2$) for delivering the collimated light to the focusing lens ($L_3$) will cause lateral displacement of the focal point or focus of the focusing lens ($L_3$) in the focal plane of the focusing lens ($L_3$). In general the lateral displacement of the collimating lens ($L_2$) and the lateral displacement of the focus or focal point of the focusing lens ($L_3$) in the focal plane may be equated by the following formula:

$$D_f = (D_1/F_2)(F_3)$$

where $D_f$ is the displacement of the focal point of lens ($L_3$) in the focal plane, $D_1$ is the displacement of the collimating lens ($L_2$) of the collimator, $F_2$ is the focal length of the collimating lens ($L_2$), and $F_3$ is the focal length of the focusing lens ($L_3$).

In the laser system of the invention, a carriage is provided for moving an optical system that includes a collimator and focusing lens along a path generally parallel to the x-axis of the target area. This movement of the carriage is used to facilitate scanning the target area along the x-axis. The collimating lens ($L_2$) of the collimator, on the other hand, is manipulated to shift the focus or focal point of the focusing lens ($L_3$) of the optical system and, as such, the lens movement is used to scan the target area along the y-axis.

Reference is now made to FIGS. 1–3 and wherein the principles of the invention are shown as embodied in a laser beam scanning device 10 which is schematically illustrated as a component of a laser marking system 11. The laser marking system 11 in addition to the scanning device 10 includes a laser system 12 and a control system 13. The latter is provided for controlling the operation of the scanning device 10 and the laser system 12 and includes a computer with conventional storage, processing and control units as well as an input/output section as depicted in FIG. 1.

The laser system 12 depicted comprises a laser beam generator 16, a cooling system 17 and a power supply 18. The generator may be a pulsed, normal mode, Nd:Yag type laser which is powered by a 500 joules per second power supply. Cooling may be accomplished by circulating a heat exchange fluid between the generator 16 and system 17 and by dissipating the heat through an air cooled liquid-air heat exchanger. The output beam 19 from the generator 16, in the embodiment depicted, is initially projected along its optical path 20 and toward a 45° mirror 22 of the scanning device 10. This mirror 22 projects the beam along a linear portion 23 of the optical path 20 and which is generally parallel to the x-axis of the target area. (FIG. 3) The mirror 22 is fixed with respect to the generator in the illustration and of course a prism may be used in lieu of the mirror. Furthermore when compactness is not a factor, or there is some other desire to do so, the laser beam may be projected directly along the linear portion 23 of the optical path 20 from the laser beam generator 16 as by suitable orientation of the generator output with respect to the path traversed by the carriage.

The scanning device 10 includes an optical system 24, and a carriage 27 for transporting the optical system along a linear path 25 in front of the target area 26. The path 25 for movement of the carriage is parallel to the linear portion 23 of the optical path 20 and the movement of the carriage 27 back and forth along path 25 is accomplished by a stepping motor 28 that is labelled a horizontal stepping motor in FIGS. 1 and 2 because it is involved in scanning along the x-axis of the print field or target area 26 of the object 21 being labelled.

The optical system 24 includes a pair of lenses ($L_1$) and ($L_2$) that form a collimator or collimating telescope 29, and a mirror 30 which is fixed to the carriage and located in the linear portion 23 of the optical path 20 for projecting the laser beam toward the target area 26 and along another linear portion of the optical path which is designated at 31. The system 24 also includes a third lens ($L_3$) which is also fixed to the carriage but, on the other hand, located in the linear portion 31 of the optical path 20 for focusing the laser beam on the target area. The light collimating lens system 29 formed by lenses ($L_1$) and ($L_2$) serves to expand the laser beam projected along the linear portion 23 of the optical path 20 and to deliver the collimated light to the focusing lens ($L_3$) which is located in the linear portion 31 of the optical path 20. In this respect, lens ($L_1$) is a negative lens which is located in the linear portion 23 of the optical path 20 for laser beam 19 and is fixed to the carriage. The collimating lens ($L_2$), on the other hand, although mounted on and movable with the carriage 27, is nevertheless mounted for linear movement along a path 32 which extends laterally of the optical axis for the focusing lens ($L_3$) and preferably is perpendicular or normal to the linear portion 31 of the optical path 20 which is traversed by the laser beam 19 after projection toward the target area by mirror 30 (see FIG. 2). The optical axis for the focusing lens ($L_3$) is shown in FIGS. 1 and 2 as coincidental with the linear portion 31 of the optical path 20 for the laser beam. At this point it may be mentioned that in lieu of mirror 30, a suitable optical system such as a prism may be used for projecting the laser beam along path 31 as will be apparent to those skilled in the art. Movement of the collimating lens ($L_2$) back and forth along the lateral path 32 of movement for the lens is accomplished by a stepping motor 33 that is labelled a vertical stepping motor in FIGS. 1 and 2 because it is involved in scanning along the y-axis for the target area 26.

As shown in the drawings, the first lens ($L_1$) encountered by the laser beam in traversing the collimator 29 is a negative lens. A positive lens may, of course, be used in lieu thereof. However, it will be found that for comparable divergence of the laser beam between the two lenses of the collimator, a longer optical path is needed between the two lenses if both lenses are positive lenses as compared to the embodiment illustrated and wherein the first lens encountered by the laser beam is a negative lens. As such, a negative lens is preferred for compactness and minimization of carriage weight and a realization of the resulting inertia benefits.

As will be seen in FIG. 1, when the carriage 27 is at its home position indicated in solid lines at 36, the focal point 35 for lens ($L_3$) in the target area will fall along the vertical broken lines 37 seen in FIG. 3, the exact position on line 37 depending, of course, on the position of lens ($L_2$) in relation to its home position. Similarly, when the carriage 27 is at its fully extended position 38, the focal point for lens ($L_3$) in the target area will fall along the vertical broken lines 39 seen in FIG. 3, the exact position, again depending on the displacement of the lens ($L_2$) from its home position.

The effect of moving the lens ($L_2$) along the linear path 32 is best seen by reference to FIGS. 2 and 3. When the collimating lens ($L_2$) is moved to its home position, indicated at 40, the focal point 35 for the focusing lens ($L_3$) falls along the broken line 41 in FIG. 3, the exact position on the line 41 depending, of course upon the position of carriage 27 relative to its home position. Similarly when the collimating lens ($L_2$) is moved to its fully displaced position indicated at 42, the focal point 35 for the focusing lens ($L_3$) will fall along the broken line 43 in FIG. 7 with the exact position also depending upon the relative position of the carriage 27 with respect to its home position.

As will be evident from FIGS. 1-3, the object 21, and thus the target area 26, is stationary or fixed with respect to the laser beam generator when the area is being scanned by the scanning device. Furthermore, it will be evident that the target area 26 may be considered as generally defined by the pair of broken lines which are designated at 37 and 41 and which are angularly arranged and intersect at the home position for the focus of the laser beam when the carriage 27 and the collimating lens ($L_2$) are at their respective home positions. Lines 41 and 37 are parallel to the x-axis and y-axis designations appearing on the object 21 in FIG. 3. As such, the broken lines 37 and 41 may be considered as a pair of intersecting and angularly arranged linear axes which, like the x-axis and y-axis shown in FIG. 3, depict the two general directions in which the stationary target area 26 is scanned by the device. Obviously, if the collimating lens movement in the embodiment depicted is in a path other than one which is normal to the linear path of movement for the carriage, any characters printed in the target area would be slanted at an angle commensurate with the deviation of the lens path of movement from that of the normal to the linear path of movement for the carriage.

To facilitate a control of the scanning device, the control system 13 of the marking system 11 has a position sensor 46 which is arranged to sense a flag 47 that is attached to the carriage 27 when the carriage 27 is at its home position 36. It also has a position sensor 48 which is arranged to sense a flag 49 that is connected in movement to the lens ($L_2$) when the collimating lens ($L_2$) is at its home position 40.

In addition to the sensors 46 and 48, the control system 13 has a linear encoder 50 which operates in conjunction with a scale 51 that is fixed to and carried by the carriage. As the carriage 27 moves out of its home position 36 and in a positive direction along the x-axis, the encoder 50 reads the scale 51 and passes a series of pulses to a pulse counter 52 that in turn is connected to the input/output section 53 of a computer 54 component of control system 13. When the carriage is moved in the positive direction along the x-axis, the pulse counter 52 operates in an additive mode whereas when the carriage is moved in a negative direction along the x-axis, the pulse counter operates in a subtractive mode. As such, the count in counter 52 at any point in time serves to locate and positively index the position of the carriage 27 and its supported components with respect to the object 21 and thus with respect to the labelling or target area 26.

Like the stepping motors 28 and 33, the home position sensors 46 and 48 for the carriage 27 and collimating lens ($L_3$) have been labelled horizontal and vertical positions in FIGS. 1 and 2 because of their association with the x- and y-axes of the print field or target area 26. The horizontal home position sensor 46 for carriage 27 is connected in a control circuit that includes an operational amplifier 56 which is connected to the input/output section 53 of computer 54. This control circuit is normally energized when the carriage 27 is absent from its home position 36 and is interrupted when the flag 47 carried by carriage 27 is sensed as the carriage enters its home position 36. The vertical home position sensor 48 for the collimating lens ($L_3$) is connected in another control circuit that includes another operational amplifier 57 which is also connected to the input/output section 53 of computer 54. This control circuit is energized when the collimating lens ($L_3$) is absent from its home position and is similarly interrupted when the flag 49 which moves with the lens ($L_2$) is sensed as it enters its home position 40.

The horizontal stepping motor 28 for moving the carriage 27 along path 25 operates under the control of the control system 13 and is connected in a control circuit that includes a motor drive circuit 58 which in turn is controlled by the computer 54 through a connection with the input/output section 53. The vertical stepping motor 33 for moving the carriage 27 along path 32 also operates under the control of control system 13. Motor 33 is connected in a control circuit that includes another motor drive circuit 59 which is also controlled by the computer through a connection with the input/output section thereof.

The computer 54 may be programmed to control the scanning device 10 to operate in accord with various modes of operation, as will be apparent to those skilled in the art. The scanning device 10 is particularly suited for the printing of alphanumeric characters in a dot matrix format. The computer 54 may be programmed to carry this out by printing each character in a line of contemplated print before the next character in the line is printed. In one of the several modes of operation capable of doing this, and assuming the use of conventional 7-row/5-column dot matrix format for printing each character and a two column spacing between adjacent characters and three row spacing between adjacent lines, the numeral "1", as seen in FIG. 4, could be completely printed in line 1 before the second character, namely the numeral "2", is printed in line 1. This could be done by scanning all thirty-five of the potential firing sights allocated in columns 1-5 of line 1 for printing the first character therein and thereafter scanning all thirty-five of the potential firing sights allocated in columns 8-12 for printing the second character in line 1. The program for accomplishing this would, of course, contemplate a firing or nonfiring of the laser generator at each potential firing point in the matrix and would again depend upon the particular character being printed.

The sequential printing of each character in a line involves unnecessary wear and tear on the mechanical components of the scanning device and in practice, the program for controlling the scanning device to print all characters in a line of print by a scanning sequence that involves scanning each row in a line sequentially as illustrated in FIG. 4 is preferred.

Before describing this scanning sequence, it should be pointed out that in the laser marker system 12 depicted in FIGS. 1–3, the characters to appear in the label to be printed in the target area 26 are put into the control system through use of the keyboard 44. In effect, the label characters are typed out on keyboard 44 and appear in the display 45. If found to be correct, the labelling information is dumped into the RAM of the computer to await the print command. At the commencement of the print command, the carriage 27 and collimating lens ($L_3$) will be located at their respective home positions 36 and 40. The collimating lens ($L_3$) will thus be focused at a position in the target area 26 which is at the tntersect of lines 41 and 37 in FIG. 3 and which corresponds to the intersect of row 1 and column 1 in line 1 of the target area depicted in FIG. 4. Assuming the computer to be programmed to print numerals "1" and "2" in the first two character positions of line 1 of the label, the motor 28 upon being energized will move the carriage in the positive direction along the x-axis. As this happens, the laser will be controlled to fire at the 3, 9, 10 and 11 column positions as the first two character positions are traversed in scanning row 1 of line 1 in the positive direction. Thereafter, the laser will be controlled to fire in accord with the characters contemplated for appearance in each of the remaining thirty-eight character positions that are contemplated in the forty character line shown in the illustration. Although, the program may contemplate a return movement of the carriage 27 in the negative direction along the x-axis before all character positions in line 1 have been scanned, as for example when no characters are to be printed at the character positions near the end of the line, the illustration contemplates a reversal direction of the carriage at the end of the scan of the last character position (the fortieth) in the line. As such, upon movement of the carriage into the 280th column position, horizontal stepping motor 28 is de-energized and vertical stepping motor 33 is energized to move the collimating lens ($L_2$) in the positive direction along the y-axis and to a point at which the focusing lens ($L_3$) focuses on the second row in line 1 and at the 280th columnar position. This is indicated by arrow 61 in FIG. 4. Once this happens, motor 28 is energized to move the carriage 27 in the negative direction along the x-axis and the laser is thereafter controlled to fire in accord with the dot entry requirements for the characters programmed in the RAM section of the storage unit and in the reverse order of the character position along row 2. In traversing the second and first character positions in row 2, while moving in the negative direction along the x-axis, the laser is fired as the carriage reaches each of the column positions 12, 8, 3 and 2 along the row. Thereafter as the carriage moves into its home position 26, the carriage motor 28 is de-energized as the sensing circuit for position sensor 46 is interrupted, and the lens motor 33 is energized to move the collimating lens ($L_2$) in the positive direction along the y-axis and until the focusing lens ($L_3$) focuses on the third row of line 1 as seen in FIG. 4. This is indicated by arrow 62. Thereupon, in the controlling sequence of operations, rows 3, 4, 5, 6 and 7 are successively scanned. As indicated by the arrows rows 3, 5 and 7 are scanned by movement of the carriage 27 in the positive direction along the x-axis while rows 4 and 6 are scanned as the carriage 27 is moved in the negative direction. On the other hand, between successive movements of the carriage, the collimating lens ($L_2$) is moved in the positive direction along the y-axis a distance which is sufficient to shift the focal point 35 of the focusing lens ($L_3$) to the next row to be scanned in the line.

Once the first line of characters is completed, the collimating lens ($L_2$) is moved in the positive direction along the y-axis a distance sufficient for the focal point 35 of the focusing lens ($L_3$) to shift to the first row of the second line of characters, as indicated by arrow 63. Thereafter, the scanning process continues with the carriage 27 being moved alternately in a positive and negative direction along the x-axis while the lens ($L_2$) is incrementally moved in a positive direction along the y-axis. This continues until all positions in all lines have been scanned and the programmed labelling of the object accomplished. Once this has been accomplished, the motor 33 is energized under the control of the computer system to move the collimating lens ($L_2$) to its home position 40. Upon reaching its home position 40, the collimating lens position is sensed by sensor 48 and an appropriate signal is sent to cause the motor 28 to move the carriage to its home position where its position is again sensed by sensor 46. When the carriage 27 and the lens ($L_2$) have reached their respective home positions 36 and 40, the print cycle is complete and the print cycle may be repeated for purposes of labelling another object after dumping the appropriate labelling information for the new label into the computer.

Figure 5:
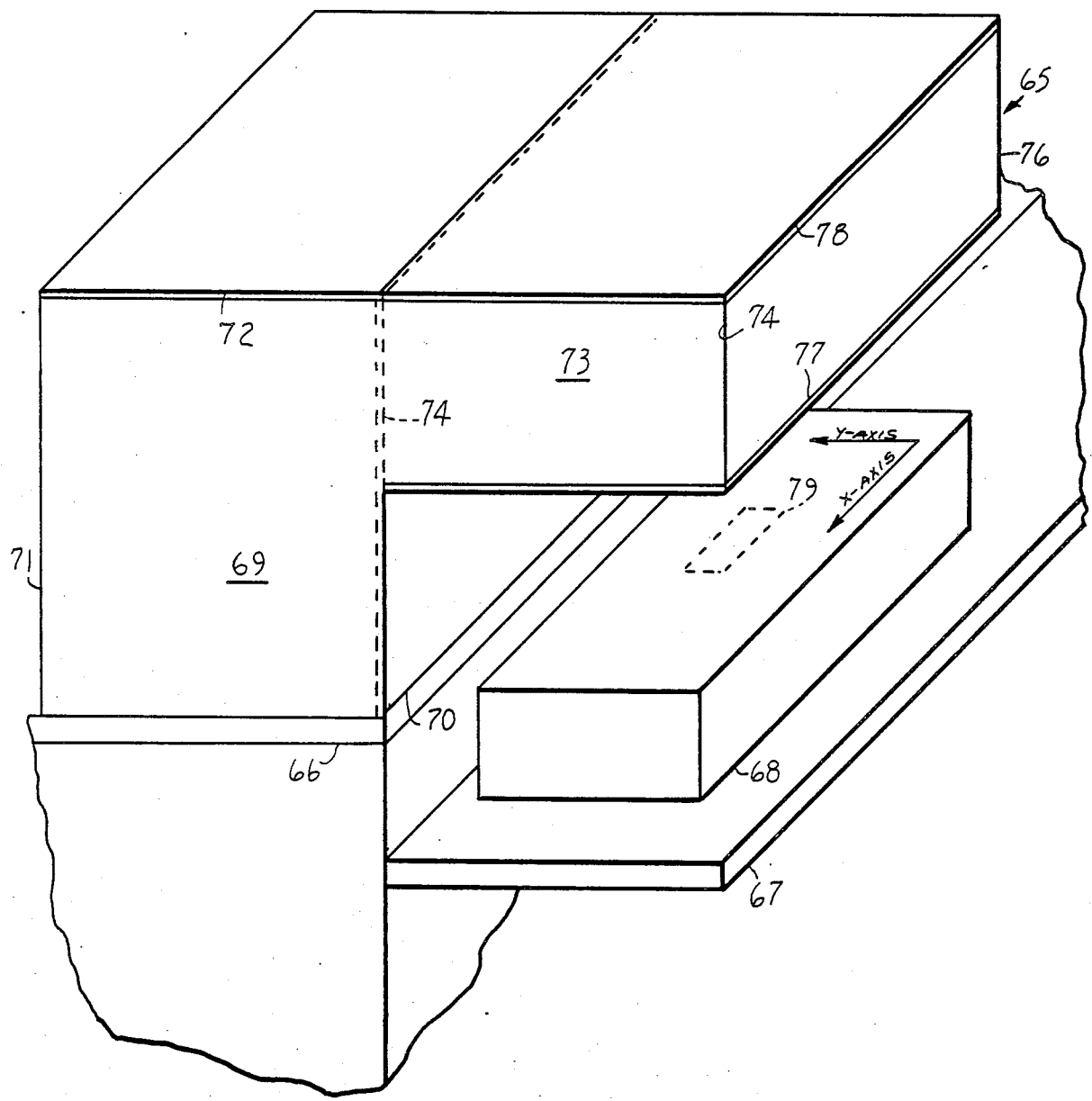
FIG. 5 is an isometric view of a laser marking system that incorporates a laser scanning device embodying the principles of the invention.

Reference is now made to the laser marking system 65 seen in FIG. 5. System 65 is seen as mounted on a support structure that has a horizontal table top 66 for supporting the marking device 65 and a laterally extending side platform 67 that provides a station for the printing of labels on rectangular metal containers, such as the container designated at 68. The housing 69 for the laser system has a front wall 70, a side wall 71, and a top wall 72 that are shown in FIG. 5. These walls 70–72 are made of metal.

The upper portion of the front wall 70 of the laser housing forms the back wall 74 of the housing 73 for the scanning device 80 and it has a window (not shown) that permits the generated laser beam to pass into the housing 73 for projection by a component of the scanning device as will be subsequently seen. This housing 73 is located above the side platform 67 to facilitate the printing of the label on the containers supported thereon. Housing 73 includes in addition to the back wall 74, a side wall 75, a front wall 76, a bottom wall 77 and a top wall 78, all of which are made of metal. The bottom wall 77 has a window (not shown) that permits the target or labelling area on the containers to be scanned by the beam during the operation of the scanning device.

Reference is now made to FIGS. 6–14 and wherein it will be seen that the top wall 78 serves as a mounting plate for the components of the scanning device 80. At the left side of the plate 78, the device 80 has a depending post 82 that is fixed to the plate by three fasteners 83. The post 82 serves as a mounting component for a mirror 84 that through the post is fixed to the plate and arranged in the optical path 85 (see FIG. 7) of the laser beam 87 emanating from the beam generator (not shown). The mirror 84 is arranged at a 45° angle to the linear portion of the optical path 85 for the laser beam emanating from the generator, and provides a means for projecting the beam 87 along a linear portion 86 of the optical path 85 and which is basically parallel to the target area 79 on the container 68 that is shown in FIG. 5. Other means may be used for projecting the laser beam along the linear portion 86 in parallel with the target area 79, such as an appropriate lens or by proper orientation of the generator output as previously indicated.

The carriage for transporting the components of the optical system 89 is designated at 90. It includes an elongated body member 91 with an elongated bore 92 (see FIGS. 10 and 11) that is aligned with the linear portion 86 of the optical path 85. The carriage also includes a structural member 93 that is located at the bottom of the carriage and fixed to the body member 91 by means of two fasteners 94. Member 91 has an upright extending L-shaped section 95 (see FIGS. 7 and 13) to which a stepping motor 96 is secured. Stepping motor 96 is fastened at the front side of the carriage 90 by means of a pair of fasteners 97. At the back side of this L-shaped section 95 of member 93, the body member 91 has a horizontally extending length 98 that overlaps an upper portion of one leg of the L-shaped section 95. Here the body and structural members 91 and 93 are secured together by the two fasteners 94.

The carriage 90 is mounted for linear reciprocating movement along a path 100 in front of the target area 79 (see FIG. 5) and in parallel with the linear portion 86 of the optical path 85 by means of a slide component 101. This slide component 101 has an elongated center member 102 which is suitably fixed to the mounting plate 78. The slide also has an elongated overlapping channel member 103 which is keyed to member 102 but nevertheless axially movable with respect to the member 102 along the carriage path 100. The body member 91 has a pair of flanges at its opposite ends and is fixed to the channel member 103 by means of appropriate fasteners 104 that extend through these flanges.

The means for moving the carriage back and forth along path 100 is provided by a stepping motor 106 that by means of suitable fasteners 107 is fixed to a plate-type bracket 108. This bracket is fixed to the mounting plate 78 in front of the carriage assembly by means of fasteners 109. Secured horizontally across the front side of the body member 91 by screw-type fasteners 111 is an elongated rack 112 that is engaged by a pinion 113 that is mounted on the shaft 114 of the stepping motor 106. This rack and pinion arrangement provides a drive connection between the motor and carriage.

The optical system 89 includes a pair of lenses 116 and 117 that are arranged to form a collimator or collimating telescope 120, and a mirror 118 which is arranged in the linear portion 86 of the optical path 85 to project the laser beam 87 toward the target area 79 and along an optical path designated at 119. The optical system also includes a lens 121 for focusing the beam on the target area. The target area 79 is, of course, by virtue of the platform arrangement seen in FIG. 5, oriented in the focal plane of the focusing lens 121.

Figure 10:
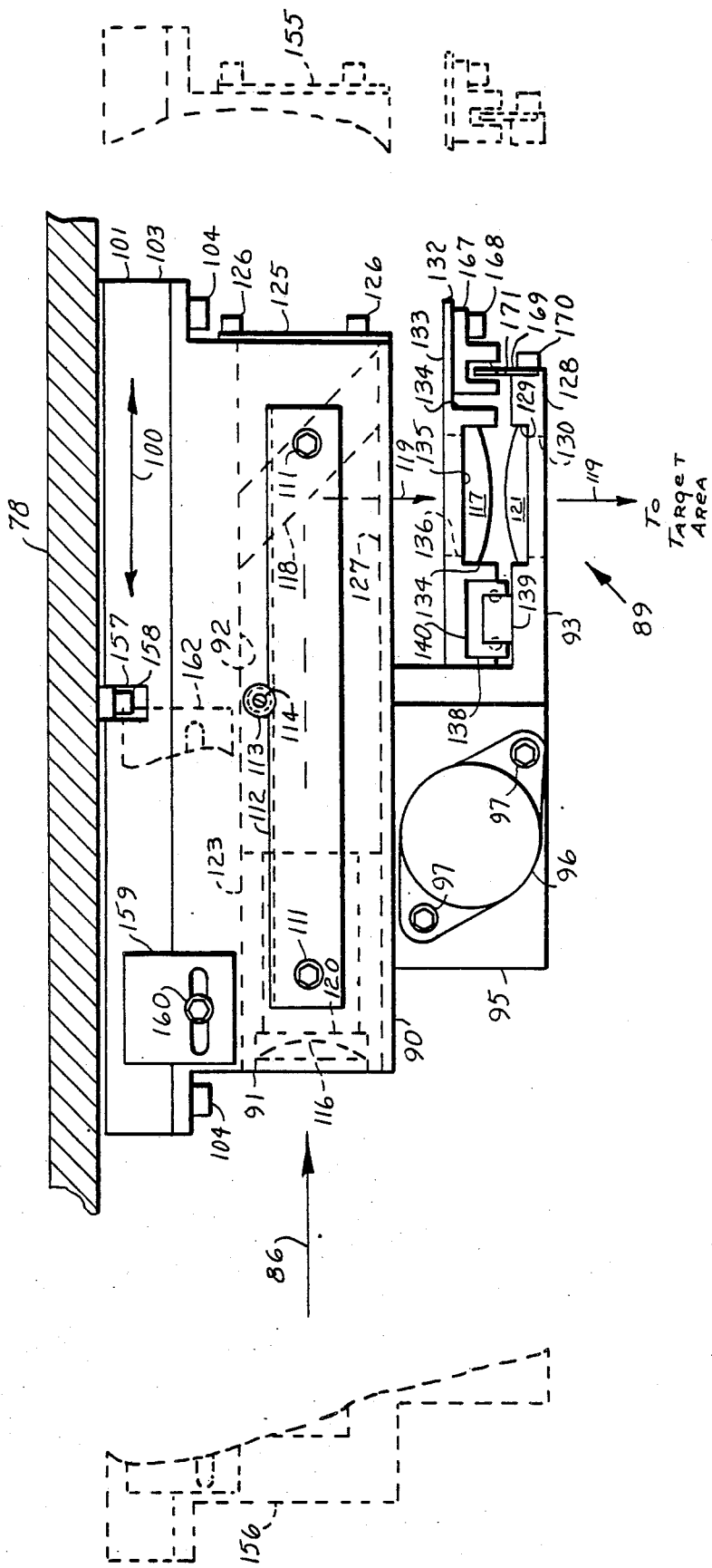
FIG. 10 is a front side elevational view of the carriage assembly and associated parts as generally seen along the Lines 10—10 of FIG. 8, the view being enlarged with certain parts being broken away or shown in section and with the approximate limits of linear movement of the horizontal carriage and certain hidden structure being shown in broken lines.
Figure 11:
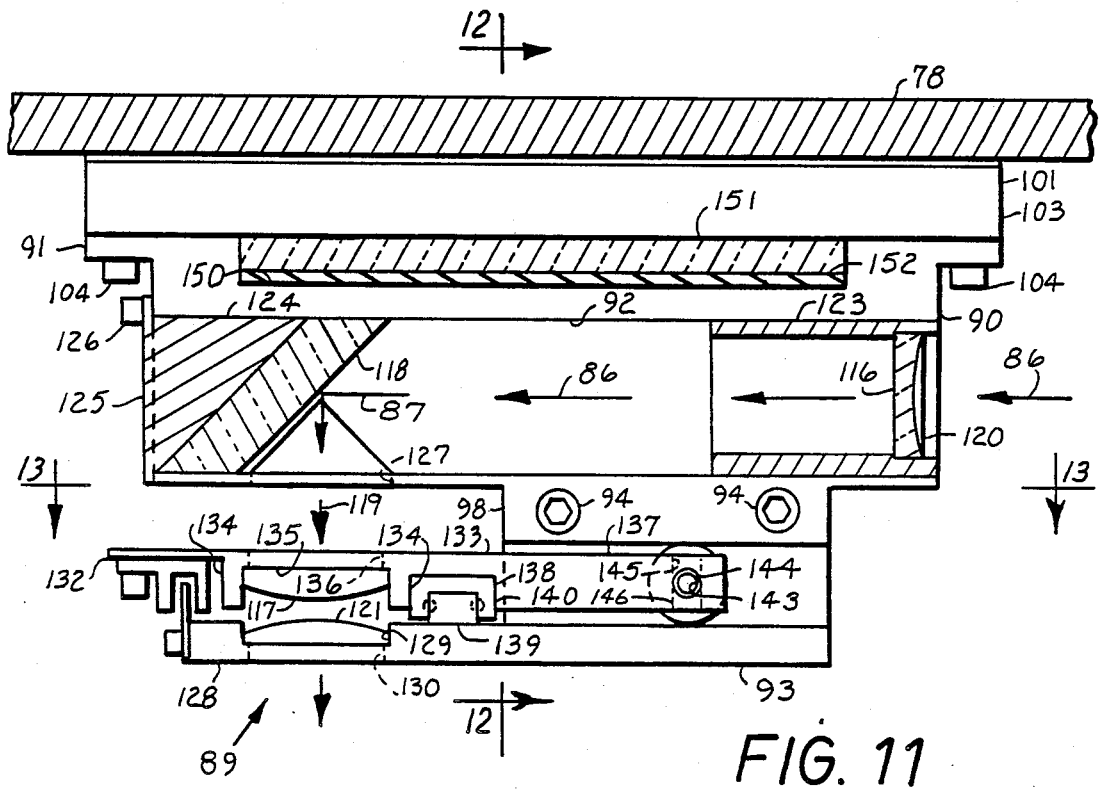
FIG. 11 is a back side elevational view of the carriage assembly and associated parts and with certain parts in section as seen along the Lines 11—11 of FIG. 9 so as to better illustrate certain optical components that are housed in a body component of the carriage assembly.
Figure 12:
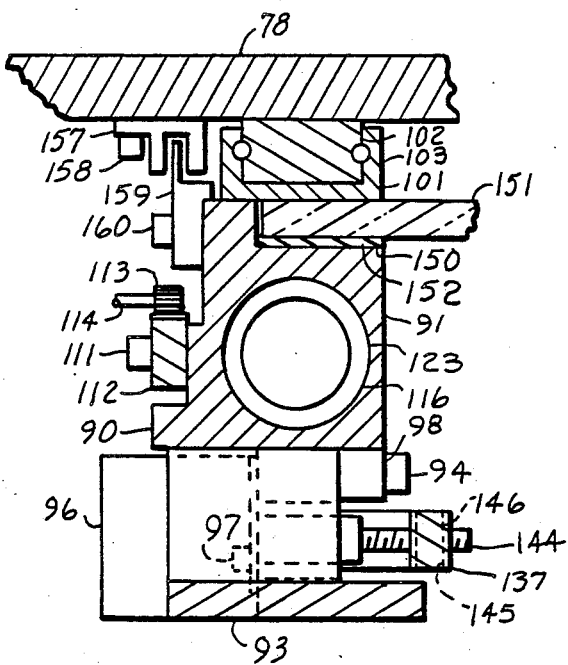
FIG. 12 is a transverse vertical sectional view through the carriage assembly and associated parts as generally seen along the Lines 12—12 of FIG. 11.

Lens 116 is a negative lens which is arranged in the linear portion 86 of the optical path 85 and therein serves to expand the beam projected along this path portion by the fixed mirror 84. The lens 116 is fixed to the carriage by means of a short, hollow, tubular member 123. Here, the lens 116 is mounted at one end of the tubular member and the tubular member 123 in turn is press fit and secured by suitable adhesive material in the left end of the horizontal bore 92 of the body member 91 (see FIGS. 10 and 11). The mirror 118 is securely fixed to the inclined end of a truncated cylindrical plug 124 that snugly fits in the right end of the body bore 92. This cylindrical plug 124 has an exterior flange 125 and the mirror assembly is fixed to the carriage and prevented from rotational movement by a pair of fasteners 126 that are threaded in the body member and engage the flange 125 at the right end of the carriage (see FIGS. 6, 10 and 14). The mirror 118 is located in the linear portion 86 of the optical path 85 and is oriented at a 45° angle thereto so as to project the expanding beam from lens 116 along a linear portion 119 of the optical path 85 which is normal or perpendicular to the linear portion optical 86. To facilitate projection of the expanding laser beam along linear portion 119 and toward the other lenses 117 and 121 of the optical system 89, the body member 91 has another bore 127 which communicates with bore 92 and laterally thereof with the exterior of the body as seen in FIG. 11.

The focusing lens 121 is securely fixed to the lower structural member 93 of the carriage assembly 90. To the right of the upstanding L-shaped section 95 of member 93 (see FIG. 10), the member 93 is provided with a flat section 128 which has an elongated flat recess 129 in its upper surface. This recess 129 extends between the front and back edges of section 128, as best illustrated in FIG. 7. At the bottom of the recess 129, the section 128 is provided with an elongated slot 130. The focusing lens 121 is fixed to the member 93 in the recess 129 by suitable adhesive material and as thus secured to the member 93 is located in the optical path 119 for the laser beam 87. The elongated slot 130, of course, provides an opening for the beam of light passing through the lens 121 to converge toward the focal plane for the lens in the target area 79 below the opening 130.

The collimating lens 117 of the light collimator 120 is mounted between the mirror 118 and the focusing lens 121 on an auxiliary carriage 132 which is mounted on the bottom member 93 of the main carriage assembly 90. The auxiliary carriage 132 is in the form of a metal structural member that has a flat plate section 133 with a pair of depending parallel and spaced apart ribs 134 that extend between the front and rear edges of the section 133 (see FIG. 13). This provides an elongated recess 135 between the ribs 134 and which in the assembled structure, faces the recess 129 in the flat section 128 of carriage member 90. At the bottom of the recess 135 in plate section 33, the section 133 is equipped with an elongated slot or opening 136 that accommodates the projection of the laser beam along the optical path 119 from the mirror 118 to the lens 117. Lens 117, of course, is mounted in the recess 135 formed by the ribs 134 and is fixed to the auxiliary carriage plate section 132 by suitable adhesive material.

Figure 13:
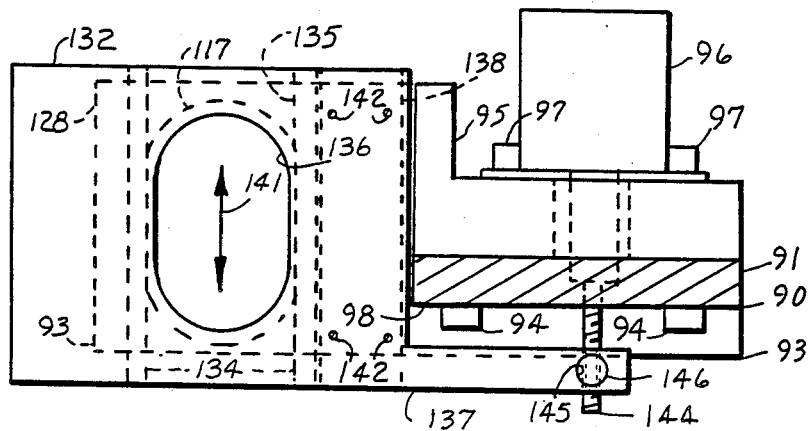
FIG. 13 is a general horizontal sectional view through the carriage assembly as seen along the Lines 13—13 of FIG. 11 to illustrate an auxiliary carriage for a collimating lens component of the optical system transported by the main carriage.

The auxiliary carriage 132 for the lens 117 is mounted for lateral movement with respect to the optical axis for the focusing lens 121 and along a linear path 141 that is normal or perpendicular to the linear portion 119. The optical axis for the lens 121 is coincident with the line 119 indicative of the linear portion of the optical path shown in FIGS. 10 and 11. The carriage 132 is mounted on bottom member 93 of carriage 90 by means of another slide component 138. This component 138 includes an elongated center member 139 that is suitably fixed to the upper surface of the flat section 128 of member 93 and in parallel with the elongated recess 129 (see FIGS. 6, 10 and 11). The slide also has an elongated overlapping channel member 140 that is keyed to the center member 139 but nevertheless axially movable with respect to the member 139 along the linear path 141 of movement for the auxiliary carriage and the collimating lens 117. This path 141 of movement for lens 117 is a linear path which is perpendicular or normal to the linear portion 119 of the optical path 85. The channel component and flat plate section 133 of the auxiliary carriage 132 are secured together by metal fasteners 142 as seen in FIG. 13.

In addition to the flat plate section 133, the auxiliary carriage 132 has an arm-type extension 137 that extends lengthwise of the body member 91 beneath the horizontal length 98 used in connecting the body member 91 to the bottom member of carriage 90. This arm-type extension is formed integral with the plate section 133 and is used primarily in drivingly connecting the auxiliary carriage 132. The stepping motor 96 is used for moving the light collimating lens 117 back and forth along the path 141. In this respect, the arm 137 is provided with a horizontal bore 143 through which the shaft 144 of the stepping motor 96 extends. The arm 137 is also provided with a vertical bore 145 that communicates with the horizontal bore 143 for the motor shaft. Here, the arm 137 is equipped with a cylindrical element 146 that snuggly fits in the vertical bore 145 and which is threadingly engaged by the threaded shaft 144 of the stepping motor. As the shaft turns, motion is imparted to the arm 137 through the cylindrical element 146.

Figure 8:
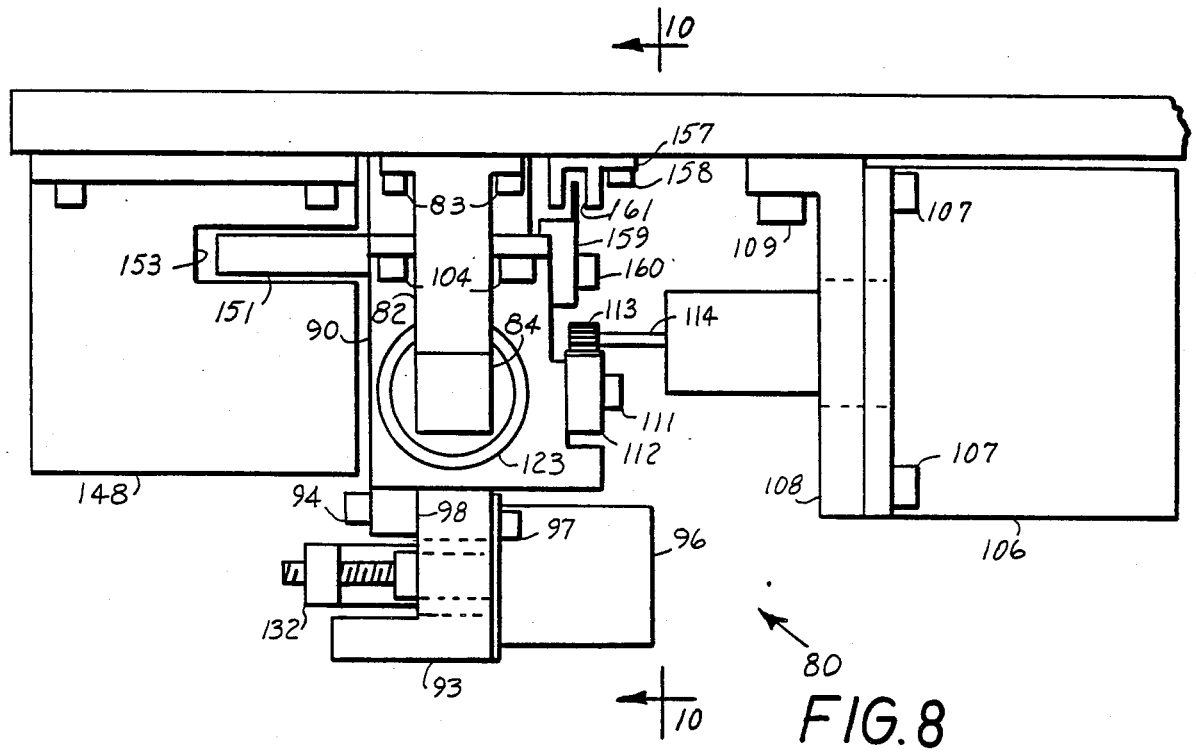
FIG. 8 is a left end vertical elevation of the laser beam scanning device shown in FIG. 6 and as enlarged and seen generally along the Lines 8—8 therein.
Figure 9:
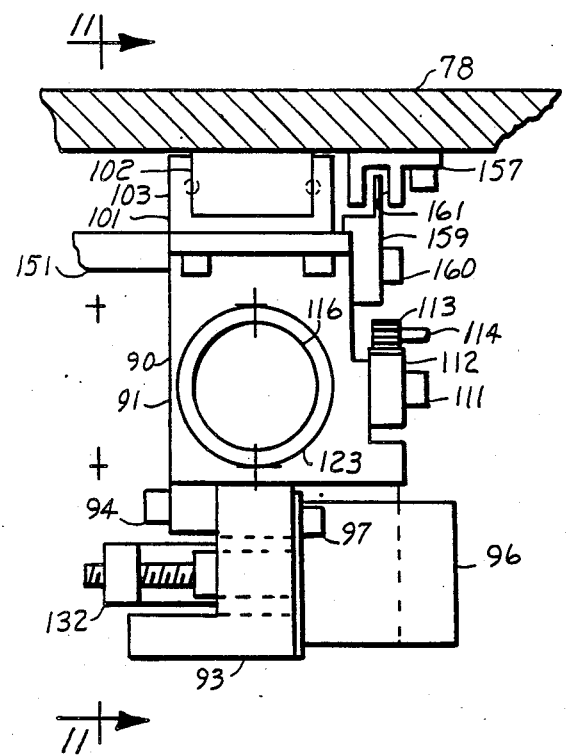
FIG. 9 is a left end elevational view of the carriage assembly seen in FIG. 6 and as enlarged and seen along the Lines 9—9 therein, certain parts being broken away or shown in section.

To monitor the movement of the carriage 90 along the path 100 and thus along the x-axis of the target area, a linear encoder 148 is fastened to the mounting plate 78 at the back side of the carriage, as by means of fasteners 149 (see FIGS. 7 and 8). The body member 91 has an elongated recess 150 that opens to the rear of the member 91 and an elongated encoder scale 151 is mounted in this recess 150 between the channel member 103 of the slide component 101 and a resilient pad 152 that is compressed in attaching the body member 91 to the slide member 101 to securely fix the scale in place. The scale 151 projects rearwardly of the body member 91 and into a slot 153 in the encoder so that appropriate markings on the scale 151 may be continuously read to index the position of the carriage 90 and thus the focused laser beam in the target area 79 in a manner such as indicated in the consideration of the embodiment described in conjunction with FIGS. 1-4.

In this embodiment, the carriage is movable between its home position 155 and an extended position designated at 156. To sense the position of the carriage at its home position 155, an optical sensor 157 is mounted on plate 78 by a fastener 158. The body member 91 of carriage 90 is in turn equipped with a flag component 159 that is adjustably secured to the body member 91 by a fastener 160. Flag 159 is aligned with a slot 161 in the optical sensor 157 and interrupts the sensor circuit when it enters the slot as the carriage reaches it home position. The position of the flag relative to the sensor when this happens is indicated at 162 in FIG. 10.

Figure 14:
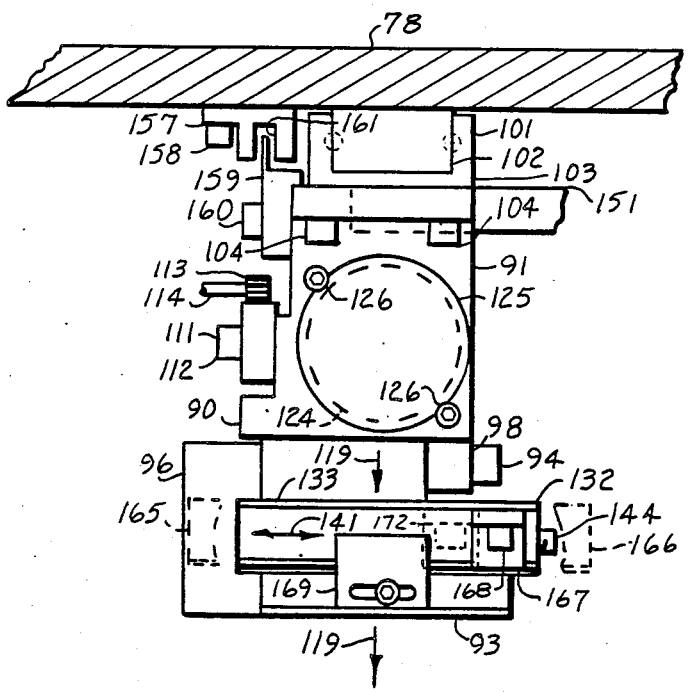
FIG. 14 is a right end vertical elevation of the carriage assembly as enlarged and generally seen along the Lines 14—14 of FIG. 6, certain parts associated therewith being broken away or shown in section, and the approximate limits of the movement of the lens carrying auxiliary carriage being shown in broken lines therein.

Movement of the auxiliary carriage 132 and thus the light collimating lens 117 along the linear path 141 is best seen in FIG. 14 and where the home position for the carriage and lens is designated at 165 whereas the extended position defining the limit of movement along the y-axis of the target area is designated at 166. In this case the home position of optical sensor 167 is mounted on and movable with the auxiliary carriage, being fixed to the underside of plate section 133 at the extreme right end of the carriage 132 by a fastener 168, as seen in FIG. 10. Flag 169 on the other hand is secured by a fastener 170 to the end of the bottom member 93 of the carriage 90 and where it is aligned to pass into the sensor slot 171 to thereby interrupt the sensor circuit when the carriage reaches its home position, as designated at 172.

The operation of the scanning device 80 of marking system 65 is deemed evident from a consideration of the discussion pertaining to FIGS. 1-4, the marking system 65 illustrated in FIGS. 5-14 being, of course, provided with a control system and laser system substantially identical to that previously discussed.

In the embodiments disclosed herein, the scanning device has been disclosed as used with a laser system in which the firing of the laser beam is accomplished through control of the laser generator. It will be appreciated by those skilled in the art, however, that the principles of the invention may be embodied in a marking system where the laser beam is fired through control of a Q-switch or other suitable beam modulating device. Under any of such circumstances, the computer program used in the control system must, of course, take into account the particular type of laser system involved in providing the beam to the scanning device, as well as the particular sequence to be followed in printing the characters on the label and the type of programming involved in entering the label information into the memory system of the computer.

The scanning device depicted is especially suited for labelling of articles and parts wherein the number of lines of print required for a viewing are low and do not normally exceed more than about six or seven lines in most instances. Thus, although the deflection of the collimating lens ($L_2$) causes the focal point of the focusing lens ($L_3$) to shift, the shift of the focal point in the direction of the y-axis by more than about two or three inches while using conventional low-cost lenses will cause distortion in those lines where the lens ($L_2$) is displaced the greatest from the optical axis of the focusing lens ($L_3$) unless the carriage is also moved in the y-axis direction. This is due to the fact that the shift of the focal point in the focal plane is axially along an arcuate surface rather than along a true planar surface. As such, there is no need for any provision to move the main carriage in any direction other than along the x-axis as long as the number of printed lines remains within readily ascertainable limits that obviously depend on the size of the characters and line spacing, among other things. On the other hand, the length of a line of print is normally limited only by the normal dispersion of the collimated monochromatic light in the laser beam that is projected along the path parallel to the carriage.

While only certain preferred embodiments of this invention have been shown and described by way of illustration, many modifications will occur to those skilled in the art and it is, therefore, desired that it be understood that it is intended herein to cover all such modifications that fall within the true spirit and scope of this invention.

What is claimed as new and what it is desired to secure by Letters Patent of the United States is:

1. A device for use in scanning a stationary target area with a laser beam wherein said target area is generally defined by a pair of intersecting and angularly arranged linear axes, said device comprising means for projecting the laser beam along an optical path having a first linear portion which projects in front of the target area and is generally parallel to one of said pair of linear axes, an optical system, and a carriage for transporting said optical system along a linear path in front of the target area and in parallel with said first linear portion of said optical path, said optical system including means fixed to the carriage and located in said first linear portion of said optical path for projecting the laser beam toward the target area and along a second linear portion of said optical path, means having an optical axis and being fixed to the carriage and located in said optical path for focusing the laser beam on the target area, and a light collimator mounted on the carriage and arranged in said optical path for traversal by the laser beam, said collimator having a lens mounted for linear movement along a path extending laterally of said optical axis and arranged to deliver collimated light to the focusing means, means for moving the carriage back and forth along said linear path, and means mounted on the carriage for moving the collimator lens back and forth along said laterally extending path to laterally move the focus of the focusing means generally in parallel with the other of said pair of linear axes.

2. A device for use in scanning a stationary target area with a laser beam in accord with claim 1 wherein said moving means for the carriage is a stepping motor, and said moving means for the collimator lens is a stepping motor.

3. A device for use in scanning a stationary target area with a laser beam in accord with claim 1 wherein said collimator lens is located in said second linear portion of said optical path, and said collimator has a negative lens arranged in said first linear portion of said optical path for expanding the laser beam.

4. A device for use in scanning a stationary target area with a laser beam in accord with claim 1 wherein said moving means for the carriage is a stepping motor, said moving means for the collimator lens is a stepping motor, said collimator lens is arranged in said second linear portion of said optical path, and said collimator has a negative lens arranged in said first linear portion of said optical path for expanding the laser beam.

5. A device for use in scanning a stationary target area with a laser beam wherein said target area is generally defined by a pair of intersecting and angularly arranged linear axes, said device comprising means for projecting a laser beam along a first linear portion of an optical path thereof, a carriage which is movable along a path which is generally parallel to one of said pair of linear axes and to said first linear portion of said optical path, a stepping motor controllable to move the carriage back and forth along the parallel path, means fixed to the carriage and located in the first linear portion of said optical path for projecting the laser beam along a second linear portion of said optical path that is generally perpendicular to said first linear portion of said optical path, a lens having an optical axis and which is fixed with respect to the carriage and located in said second linear portion of said optical path for focusing the laser beam on said target area, a light collimator mounted on and carried by said carriage having a first lens which is fixed with respect to said carriage and arranged in said first linear portion of said optical path, and a second lens which is arranged in said second linear portion of said optical path between the projecting means in the first linear portion of said optical path and the focusing lens, said second lens being movable relative to the carriage along a path extending laterally of said optical axis and arranged to deliver collimated light to said focusing lens, and a stepping motor mounted on said carriage and controllable to move the second lens back and forth along said laterally extending path to laterally move the focus of the focusing lens generally in parallel with the other of said pair of linear axes.

6. A device for use in scanning a stationary target area with a laser beam in accord with claim 5 wherein said first lens is a negative lens for expanding the laser beam projected along said first linear portion of said optical path.

7. In a laser marking system having a laser beam generator, a device for scanning a stationary target area which is to be marked with the laser beam and is generally defined by a pair of intersecting and angularly arranged linear axes, and a control system for controlling the operation of the scanning device and laser beam generator, the improved scanning device comprising means for projecting the generated laser beam along an optical path having a first linear portion which projects in front of the target area and is generally parallel to one of said pair of linear axes, an optical system, and a carriage for transporting said optical system along a linear path in front of the target area and in parallel with said first linear portion of said optical path, stepping motor means operating under the control of said control system for moving said carriage along said linear path, said optical system including means fixed to the carriage and located in the first linear portion of said optical path for projecting the laser beam toward the target area and along a second linear portion of said optical path, means having an optical axis and being fixed to the carriage and located in the second linear portion of said optical path for focusing the laser beam on the target area, and a light collimating lens system mounted on and carried by said carriage for expanding the laser beam projected along said first portion of said optical path and delivering collimated light to said focusing means, said light collimating lens system having a lens mounted for linear movement along a path extending laterally of said optical axis and being arranged to deliver said collimated light to said focusing means, and said device further comprising stepping motor means mounted on said carriage and operating under the control of said control system for moving the lens of the lens system back and forth along said laterally extending path to laterally move the focus of the focusing means generally in parallel with the other of said pair of linear axes.

8. In a laser marking system having a laser beam generator, a device for scanning a stationary target area which is to be marked with the laser beam and is generally defined by a pair of intersecting and angularly arranged linear axes, and a control system for controlling the operation of the scanning device and laser beam generator, the improved scanning device in accord with claim 7 wherein said lens of the lens system is located in said second linear portion of said optical path, and said light collimating lens system has a negative lens which is arranged in said first linear portion of said optical path.

9. A device for use in scanning a stationary target area with a laser beam and wherein said target area is generally defined by a pair of intersecting and angularly arranged linear axes comprising means for projecting the laser beam along an optical path having a first linear portion which projects in front of the target area and is generally parallel to one of said pair of linear axes, a carriage which is moveable along a first linear path that is parallel to said first linear portion of said optical path, means controllable to move the carriage back and forth along said first linear path, means fixed to the carriage and located in said first linear portion of said optical path for projecting the laser beam toward said target area and along a second linear portion of said optical path, first lens means having an optical axis and being mounted on and moveable with said carriage and located in said optical path for focusing said laser beam on said target area, and a light collimator arranged in said optical path for traversal by said laser beam and being mounted on and moveable with said carriage for expanding said laser beam and delivering collimated light to said first lens means, said light collimator including second lens means arranged to deliver said collimated light to said first lens means and mounted for movement along a path extending laterally of said optical axis, and means mounted on the carriage for moving said second lens means back and forth along said laterally extending path to laterally move the focus of the first lens means generally in parallel with the other of said pair of linear axes.

* * * * *